United States Patent [19]

Aranda

[11] Patent Number: 5,321,809
[45] Date of Patent: Jun. 14, 1994

[54] CATEGORIZED PIXEL VARIABLE BUFFERING AND PROCESSING FOR A GRAPHICS SYSTEM

[75] Inventor: Michael A. Aranda, Saugerties, N.Y.

[73] Assignee: International Business Machines Corporation, Armonk, N.Y.

[21] Appl. No.: 943,951

[22] Filed: Sep. 11, 1992

[51] Int. Cl.$^5$ ............................................. G06F 15/62
[52] U.S. Cl. .................................. 395/164; 395/122; 395/162; 345/201
[58] Field of Search ................ 395/121, 122, 162–166; 340/723, 724, 728, 729, 744, 798–799; 365/230.05, 230.04; 345/185, 133, 196, 147, 201, 203

[56] References Cited

U.S. PATENT DOCUMENTS

| | | | |
|---|---|---|---|
| 4,435,792 | 3/1984 | Bechtolsheim | 365/189.02 |
| 4,475,104 | 10/1984 | Shen | 395/122 |
| 4,546,451 | 10/1985 | Bruce | 364/900 |
| 4,602,283 | 7/1986 | Corgnier et al. | 380/14 |
| 4,621,320 | 11/1986 | Holste et al. | 364/200 |
| 4,679,041 | 7/1987 | Fetter et al. | 340/747 |
| 4,924,415 | 5/1990 | Winser | 395/122 |
| 4,924,522 | 5/1990 | Bray et al. | 382/56 |
| 4,933,909 | 6/1990 | Cushing et al. | 365/230.05 |
| 4,961,153 | 10/1990 | Fredrickson et al. | 395/122 |
| 4,970,499 | 11/1990 | Ryherd et al. | 340/729 |
| 5,005,117 | 4/1991 | Ikumi | 395/122 |
| 5,008,838 | 4/1991 | Kelleher et al. | 395/164 |
| 5,023,838 | 6/1991 | Herbert | 365/189.08 |
| 5,043,921 | 8/1991 | Gonzalez-Lopez et al. | 395/122 |
| 5,065,368 | 11/1991 | Gupta et al. | 365/230.05 |

FOREIGN PATENT DOCUMENTS 0307019 3/1989 European Pat. Off. ...... G06F 15/72

OTHER PUBLICATIONS

"Improved Video RAM Read Transfer Cycle", L. Johnson and D. Kokoszka; IBM Technical Disclosure Bulletin, vol. 34, No. 1, Jun. 1991, pp. 479–480.

*Primary Examiner*—Dale M. Shaw
*Assistant Examiner*—Kee M. Tung
*Attorney, Agent, or Firm*—Heslin & Rothenberg

[57] ABSTRACT

A modified frame buffer and pixel variable read-modify-write method are described for a high performance computer graphics system. Pixel variables are initially classified as decision variables, intensity variables or decision/intensity variables. Only decision/intensity variables requiring a read-modify-write operation, are stored in dual interleaved DRAMs for improved bandwidth. Decision variables and intensity variables each utilize a single address/data bus per video RAM module in the frame buffer, while decision/intensity variables require dual address/data buses for accessing the interleaved memory banks. Enhanced bandwidth is obtained with a minimization of raster engine I/O requirements.

18 Claims, 8 Drawing Sheets fig. 5

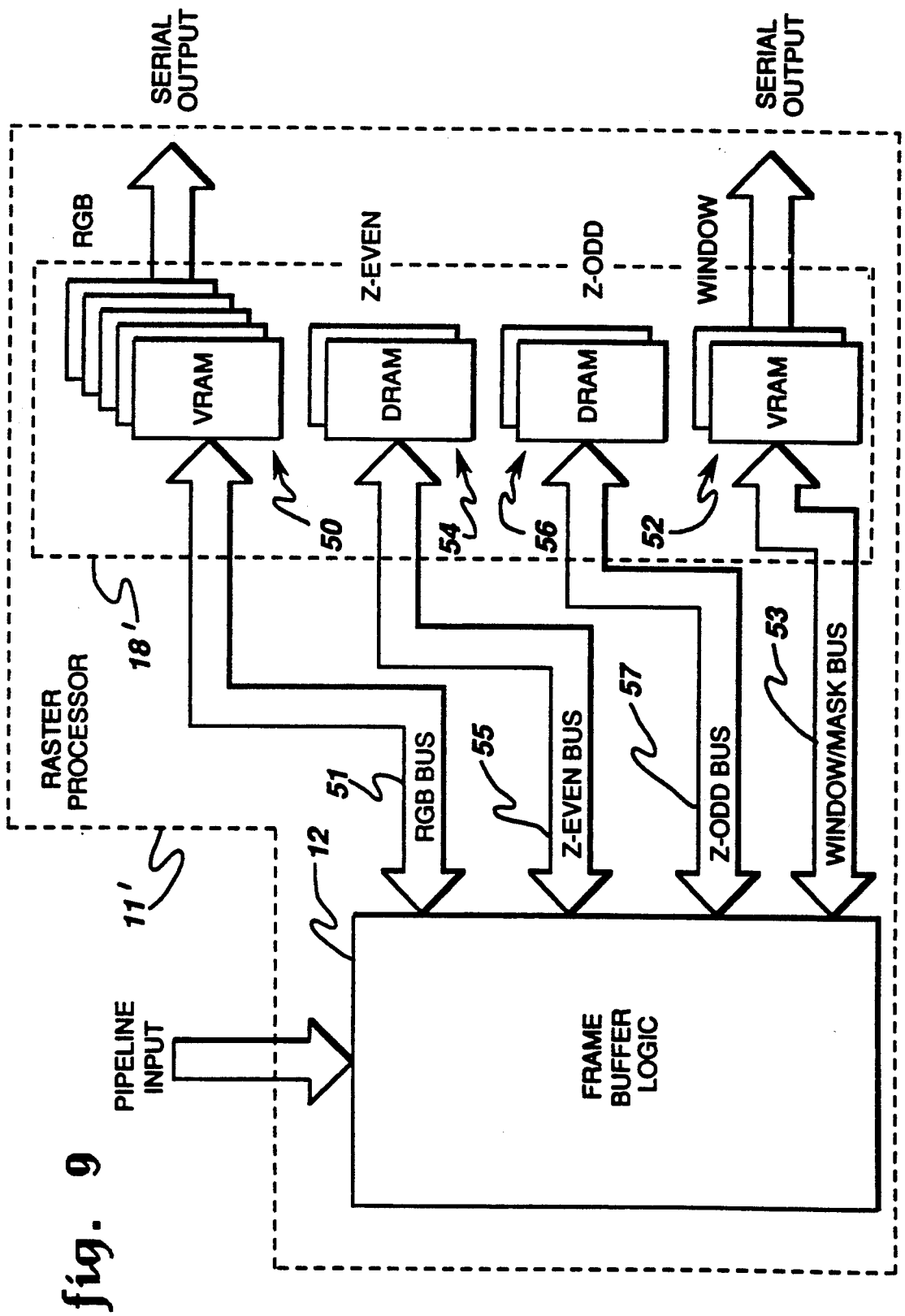

CATEGORIZED PIXEL VARIABLE BUFFERING AND PROCESSING FOR A GRAPHICS SYSTEM

TECHNICAL FIELD

This invention relates in general to computer graphics display systems, and more particularly, to a high performance computer graphics system and method which attain fast frame buffer updating through interleaved buffering of only selected ones of the variable values definitive of a three-dimensional graphics object to be rendered on a display screen.

BACKGROUND ART

Computer graphics display systems, e.g., CAD/CAM graphics workstations, are widely used to generate and display two-dimensional images of three-dimensional objects for scientific, engineering, manufacturing and other applications. In such high performance computer graphics systems, digital representations of computer generated images conventionally reside in an array of video RAM, which collectively embody the system frame buffer. The rate at which the frame buffer can be updated is a critical parameter in the performance of the entire graphics system. With the ever increasing use of engineering/scientific graphics workstations, there is a need to perform ever more complex rendering algorithms.

Displaying three-dimensional objects on a two-dimensional display device in part requires a graphics system to recognize and eliminate hidden surfaces and lines to obtain the desired three-dimensional effect. One popular method for eliminating hidden surfaces of an image to be rendered involves the use of a depth buffer or Z-buffer. A Z-buffer is a large array of memory with an entry for each picture element, or pixel, on the graphics system's display device.

The Z-axis in a graphics system reflects the distance from a specified observer's viewpoint. Thus, for example, a larger Z value may be defined to represent a greater distance from a viewpoint. A comparison of Z values of points on generated objects determines which object is closest to the viewpoint and therefore which object should appear on the two dimensional display. In Z-buffer systems, as each pixel is generated its Z coordinate (ZNEW) is compared with the Z coordinate previously stored in the Z-buffer (ZOLD). If ZOLD does not exist, then ZNEW is compared to the Z coordinate of the background. If ZNEW is less than ZOLD (indicating in the present example that the pixel is closer to the viewpoint than the previous pixel), then the pixel is written to the display device and the Z-buffer memory is updated to contain ZNEW. If ZNEW is greater than or equal to ZOLD, then the pixel is not written and the Z-buffer remains unchanged. A description of the Z-buffer technique is presented by J. D. Foley and A. Van Dam, in *Fundamentals of Interactive Computer Graphics*, Addison-Wesley Publishing Co., pp. 560–561 (1982).

The use of a Z-buffer simplifies the solution of the hidden surface problem, however, the speed at which the Z-buffer memory can read, compare and update limits the graphics system pixel writing speed. The large amount of memory required, typically one megabyte or more, and the cost of these devices normally dictates the use of dynamic random access memory (DRAM) instead of more costly static random access memory (SRAM). Commercially available DRAMs may, for example, have read-modify-write (RMW) cycle times on the order of 200 nanoseconds (ns). However, the typical computer graphics processor is capable of generating pixel data at higher speeds, e.g. 100 nanoseconds per pixel, and a display device is capable of receiving pixel data at equally high speeds. Therefore, the slow RMW cycle of the DRAM for Z-buffering is a limiting factor on the ability to speed the display generation process. Thus, in conventional frame buffer designs, read-modify-write operations decrease frame buffer bandwidth and overall system performance.

Various approaches to enhancing frame buffer bandwidth have been proposed. For example, in U.S. Pat. No. 4,679,041, entitled "High Speed Z-Buffer With Dynamic Random Access Memory", issued to Fetter et al., a system which overlaps the ZNEW calculation with the ZOLD read-modify-write cycle is described. In another patent, U.S. Pat. No. 5,043,921, entitled "High Speed Z-Buffer Control", issued to Gonzalez-Lopez et al. and assigned to the same assignee as the present invention, a rapid comparison of values by comparing blocks of Z values with each cycle is discussed. The most straightforward approach to improving performance is to divide the entire frame buffer into two separate devices so that the characteristics of adjacent pixels can be alternately stored in different ones of the two devices. In this way, read-modify-write operations on different but adjacent pixels can be overlapped thereby increasing processing performance. The difficulty with this approach, however, is that twice the number of pins are required of the raster engine to access the dual devices. This requirement proves in practice to be a significant complication.

Packaging technology has been improving almost linearly over the last decade, while memory/logic technology has expanded exponentially. Thus, the density of available pin packaging is an ever more important consideration in the implementation of a high performance computer system, such as a graphics display system.

Therefore, a need exists in the graphics display industry for enhanced frame buffer throughput (and in particular, for enhanced performance of read-modify-write cycles used in the implementation of the conventional Z-buffering technique) while, to the extent possible, minimizing the number of I/O pins utilized by the raster engine to attain the enhanced processing.

DISCLOSURE OF THE INVENTION

Briefly summarized, in one aspect of the present invention a graphics display system frame buffer for receiving pixel variable values definitive of an object to be rendered on a display screen of the graphics system is presented. The display screen includes an array of pixels each, of which is defined by a plurality of pixel variable values. The novel frame buffer includes at least one first module of memory having storage locations corresponding to the display screen pixel array. Each first memory module buffers values for at least one particular pixel variable. The particular pixel variable comprises either a decision variable or an intensity variable. Advantageously, the storage locations of the first memory module are accessible through a single address/data bus combination. At least one second module of memory is also provided. The second memory module is divided into a first bank of memory and a second bank of memory which have interleaved addressing and together have a storage location corresponding to each pixel of the display screen pixel array. Each second memory module buffers values for at least one pixel decision/ intensity variable. The storage locations of the second memory module are accessible through separate data/address bus combinations, one bus combination being connected to the first memory bank and the other bus combination being connected to the second memory bank. Additional specific details of the novel frame buffer are presented herein.

In another aspect, a raster processor is described for processing primitive information definitive of objects to be rendered on a display screen of the graphic system. The display screen again has an array of pixels, each of which is defined by a plurality of pixel variables. The raster processor includes a frame buffer controller which receives and processes primitive information into pixel variable values for rendering an object on the display screen. A frame buffer, divided into at least one first memory module and at least one second memory module, is associated with the controller. Each first memory module has a storage location corresponding to each pixel of the display screen pixel array, while each second memory module is divided into a first bank of memory and a second bank of memory, which have interleaved addressing and taken together have a storage location corresponding to each pixel of the display screen pixel array.

The first memory module and the second memory module each buffer a particular pixel variable. A first address/data bus combination is associated with each first memory module of the frame buffer for interconnecting the first memory module with the frame buffer controller. In addition, at least two second address/data bus combinations are associated with each second memory module of the frame buffer such that one of the second bus combinations interconnects the first bank and the frame buffer controller and the other of the second bus combinations interconnects the second bank of the second memory module and the frame buffer controller. Each first memory module receives values of a decision variable or an intensity variable for a corresponding pixel location of the display screen pixel array, while each second memory module receives values for a decision/intensity variable for the corresponding pixel location of the display screen pixel array. As with the frame buffer embodiment, further details of this aspect of the present invention are also provided herein.

In another aspect, the present invention comprises a method for storing pixel variable values definitive of objects to be rendered on a display screen of a graphics system. The display screen includes an array of pixels each of which is defined by a plurality of pixel variables in associated memory modules. The method includes the steps of: categorizing pixel variables for storage into one of three categories based on type (the categories include decision variables, intensity variables, and decision/intensity variables); buffering each decision variable value and each intensity variable value into a first type of memory module comprising a commonly accessed unified grouping of memory; and buffering the decision/ intensity variable values into a second type of memory module which is divided into two separate memory banks. The decision/intensity variable values are buffered into the second type of memory module in an interleaved manner between the two banks in order that reading of values from one bank may occur simultaneously with the writing of values to the other of the two banks. To accomplish this, separate address/data bus combinations are required for buffering the decision/intensity variable values to the two memory banks. Additional details of this method are also explained herein.

To restate, read-modify-write memory cycles typically require twice as long to process as a single "read" or a single "write" function. The present invention effectively doubles the read-modify-write performance of conventional frame buffer design by categorizing variables and buffering variables based on pixel variable type, prefetching decision variables, interleaving decision/intensity variables of adjacent pixels into opposite memory banks of a memory module, and overlapping the writing of one video RAM bank with the prefetching of another video RAM bank. Thus, multiple banks are only utilized for those pixel variables defined as decision/intensity types. Therefore, the number of pins needed by the raster engine to access the pixel information in the frame buffer as a whole remains minimized in comparison with any prior art implementation, while still obtaining fast polygon rendering.

BRIEF DESCRIPTION OF DRAWINGS

These and other objects, advantages and features of the present invention will be more readily understood from the following detailed description of certain preferred embodiments of the present invention, when considered in conjunction with the accompanying drawings in which:

FIG. 5 depicts the mapping of information into column addresses within a sample rectangular block of FIG. 4;

FIG. 9 is a partial high level data flow diagram depicting four independent address/data buses disposed between memory modules of the frame buffer and frame buffer logic pursuant to the present invention.

BEST MODE FOR CARRYING OUT THE INVENTION

Reference is now made to the drawings in which the same reference numbers are used throughout the different figures to designate the same or similar components.

Figure 1:
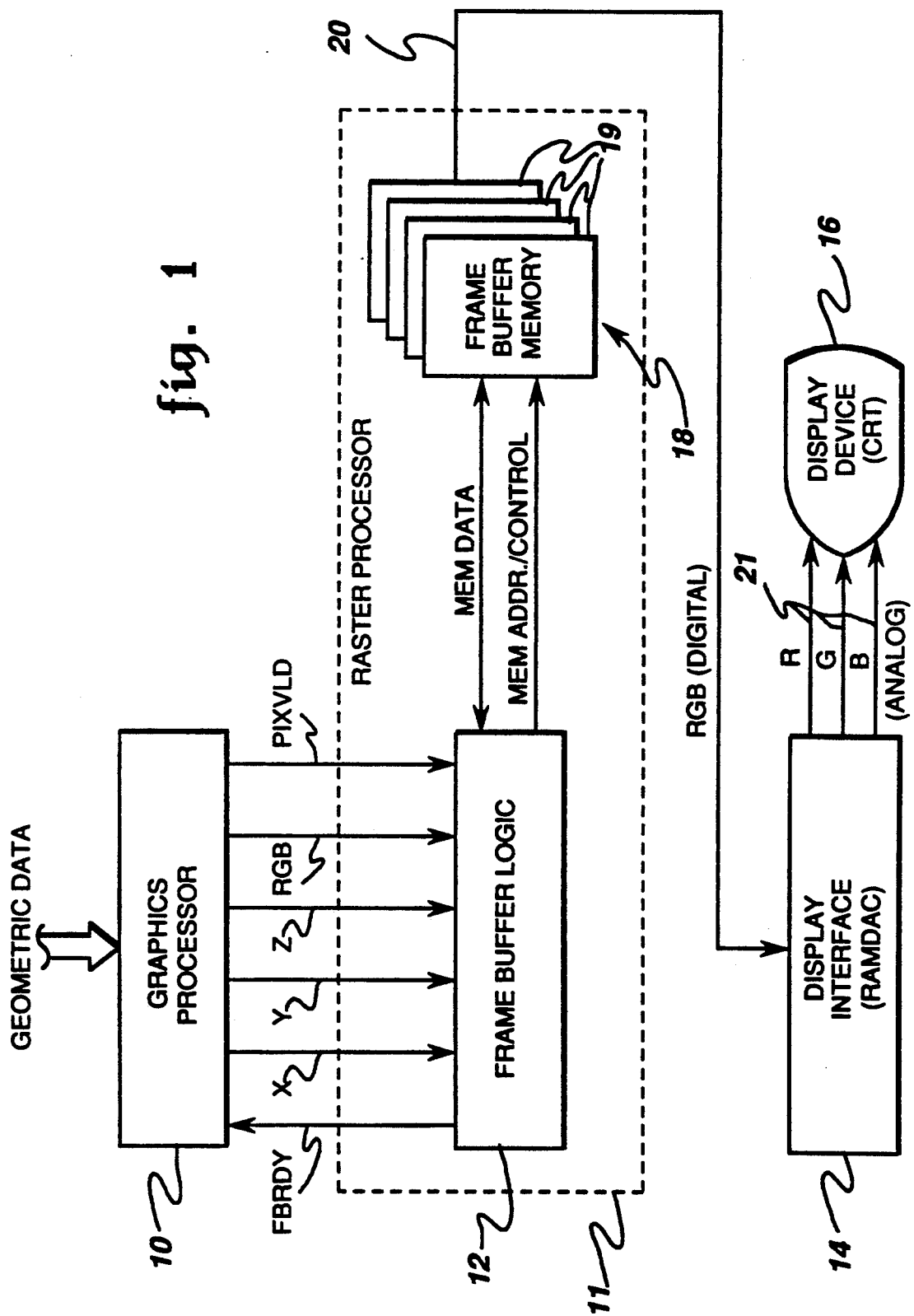
FIG. 1 is a block diagram illustration of a graphics system structure.

A graphics system is shown schematically in FIG. 1. A graphics processor 10 generates from received geometric data an X, Y and Z coordinate for each pixel of an object to be rendered. Along with the three axis coordinates, a color, usually specified by red, green and blue components (RGB), is generated for each pixel required to describe an object to be rendered. The graphics processor may start at any X, Y, Z coordinate location and generate a sequence of adjacent pixels, typically proceeding in the vertical or horizontal direction. In the embodiment depicted, the processor also generates an "PIXVLD" signal which informs an associated raster processor 11 that valid pixel data is available. A signal "FBRDY" is generated by a frame buffer controller 12 of associated raster processing engine 11. Signal "FBRDY" indicates that the frame buffer is ready to accept pixel data.

A display interface (or RAMDAC 14) accepts ordered pixel data from engine 11 in the form of digital color (RGB) via line 20. (This data is provided by frame buffer memory 18 from the serial port of the video RAM modules, discussed below, and is ordered to correspond to screen pixel locations.) The display interface operates to generate the analog signals RGB on line 21 necessary to display the image on a display device (or CRT) 16 (along with the appropriate control signals). Although a CRT or monitor device is shown in the preferred embodiment, the techniques employed herein work equally well for any two-dimensional display device such as a plotter, printer, or other monitor type.

Frame buffer control logic 12 controls, in part, the evaluation of each Z coordinate to eliminate surfaces or lines hidden behind other surfaces. The frame buffer 18 is provided with Z-buffer memory in which each pixel on the display device has a corresponding entry. Memory 18 comprises a plurality of video RAM modules and DRAM modules 19. As described below, pursuant to the present invention the frame buffer is uniquely organized so that selected variables definitive of adjacent screen pixels may be located in different banks of a memory module.

As mentioned initially, the frame buffer controller accumulates the pixel data from the graphics processor for adjacent pixels and then performs, in part, Z-buffer comparison. All pixels whose ZNEW are, for example, less than ZOLD are updated and corresponding color data is sent to the display interface 14. Otherwise, the pixel data is discarded. The pixel data is transmitted serially for display by a display device 16. The invention discussed herein encompasses a novel frame buffer design and pixel variable processing approach which increases polygon rendering performance at a more modest silicon and I/O cost than previous frame buffer layout and processing approaches. The invention is based on the idea of categorizing pixel variable values definitive of the pixels to be displayed based on type. Pixel variables are initially separated into two groups, namely, "Decision Variables" and "Intensity Variables."

As is well known, a pixel is comprised of many variables such as color (RGB), depth (Z), window id, mask, translucence ($\alpha$), etc. Of these variables, "Decision Variables" are defined herein as variables which typically test for an inequality ($=, <, >, < >$, etc.). The result of an inequality determines whether the frame buffer logic should update the particular pixel in memory and at the display interface. "Intensity Variables", on the other hand, are defined to embody a physical characteristic of a pixel, such as color (RGB) and depth (Z). Complicating the categorization of pixel variables is the recognition that certain pixel variables comprise both Decision Variables and Intensity Variables.

As an example of a Decision Variable, consider windowing. The need to provide multiple, independent display windows has increased significantly over the last several years. One popular technique used to render into a certain window, while protecting the area of others, is "window identification comparison." In window identification comparison, each pixel is preassigned a window id corresponding to the shape of non-obscured or partially obscured windows. Before placing a pixel (during a rendering operation), the window id of the pixel is read from the frame buffer and compared to the active window id. If the window id of the pixel matches the active window id, then the pixel is replaced. Therefore, a pixel's window id must be read from the frame buffer before a pixel is updated.

As another example of a Decision Variable, consider the depth value variable. Graphics systems render realistic images by providing a viewer with depth cues such as hidden surface removal. As discussed, a practical and widely used hidden surface removal technique is Z-buffering. Z-buffering stores depth information in the frame buffer on a pixel basis. When rendering a smooth surface, a pixel may be visited several times, each visit representing a point on the surface at different depths. Determining the closest point is performed "on-the-fly" by the frame buffer logic by comparing the Z component of each point (ZNEW) to the stored Z value (ZOLD) in the frame buffer. If the Z component (ZNEW) is less than (i.e., closer than in the present example) the stored Z value (ZOLD), then the Z value (and color values) in the frame buffer are replaced. Since Z is used to determine whether an update should occur, it is a Decision Variable. However, Z (depth) is also a physical characteristic of a pixel and is therefore also an Intensity Variable.

Figure 2:
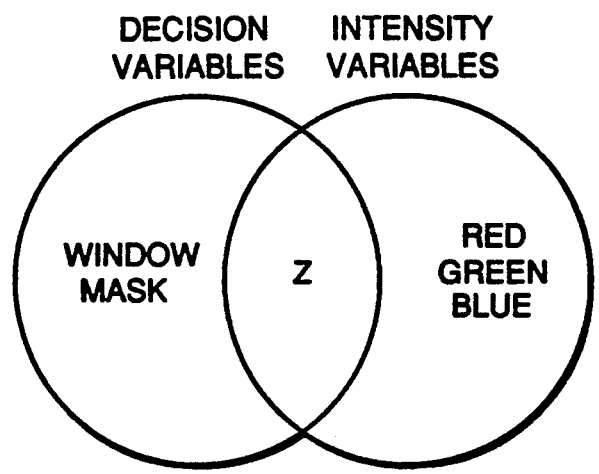
FIG. 2 depicts overlapping categorization of pixel variables pursuant to the present invention.

FIG. 2 illustrates categorization (pursuant to the present invention) of a pixel's color (RGB), depth (Z), window id and mask variables. For the sake of clarity, variables which exhibit both decision and intensity characteristics (such as Z) are referred to herein as "Decision/Intensity Variables". Thus, pursuant to the categorization of the present invention, a pixel variable can be defined as one of three different types of variables, i.e., a Decision Variable, an Intensity Variable or a Decision/Intensity Variable.

Figure 3:
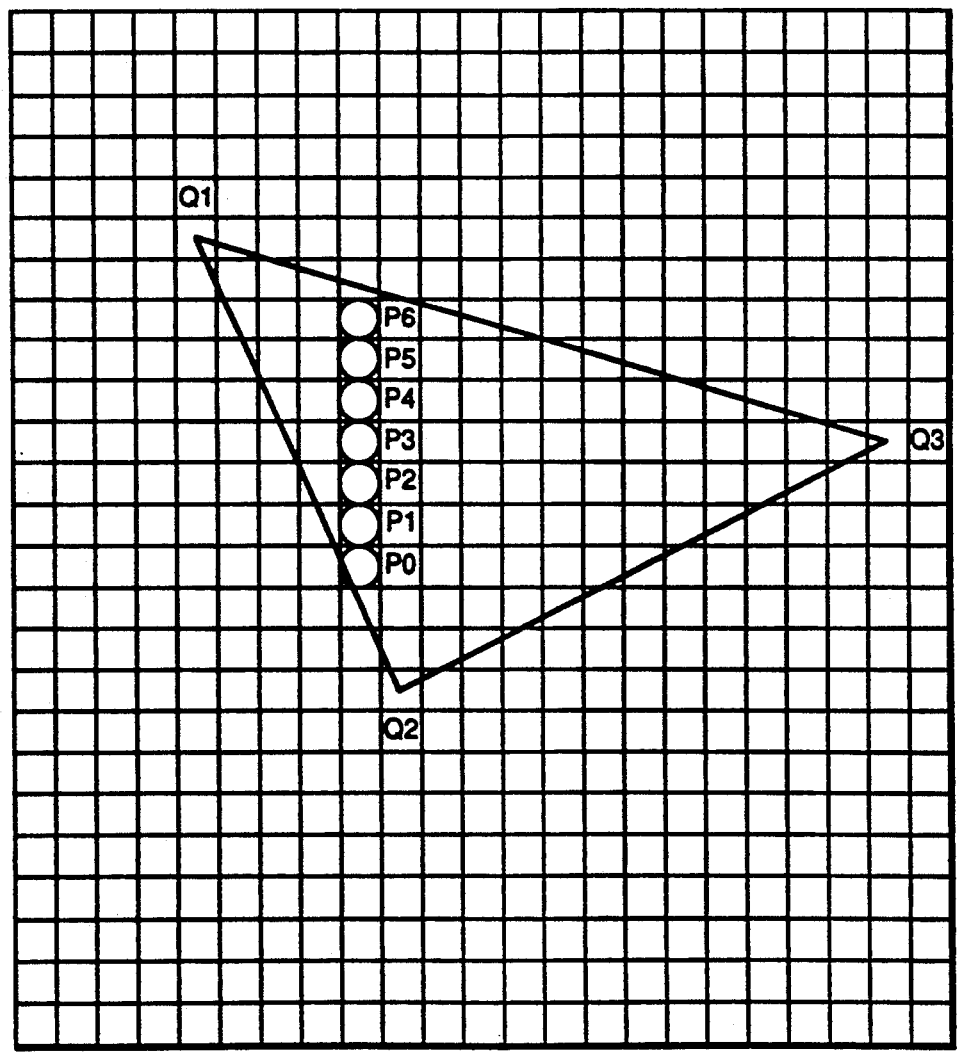
FIG. 3 is a graphical representation of a two dimensional triangle primitive to be generated on a display screen pursuant to the present invention.

As is now well known in the graphics processing field, polygon rendering hardware employs three points to define a triangle. In the example of FIG. 3, each point (Q1,Q2,Q3) includes color (R,G,B) and coordinate (X,Y,Z) information. From these three points, Q1,Q2,Q3, the hardware interpolates (with any one of various available methods) the interior pixels' color and depth (Z). Once a pixel's color and depth is calculated, the hardware then writes the pixel into the frame buffer by subdividing the polygon into horizontal or vertical spans. Each span is a row or column of interior pixels. In FIG. 3, the interior of the triangle is defined by vertical spans, of which one is shown to comprise the span of interior pixels (P0)–(P6).

The present invention significantly improves upon polygon rendering by making use of three key observations. Namely:
1. Decision Variables are typically read from the frame buffer;
2. Intensity Variables are typically written to the frame buffer; and
3. polygons are typically written to the frame buffer in vertical or horizontal spans.

For the sake of illustration, a screen is assumed to be partitioned into rectangular blocks, or tiles. Each tile represents an area of the screen within the same VRAM row address. This is a common technique which minimizes row violations during VRAM updates. For example, see U.S. Pat. No. 4,546,451, entitled "Raster Graphics Display Refresh Memory Architecture Offering Rapid Access Speed."

Figure 4:
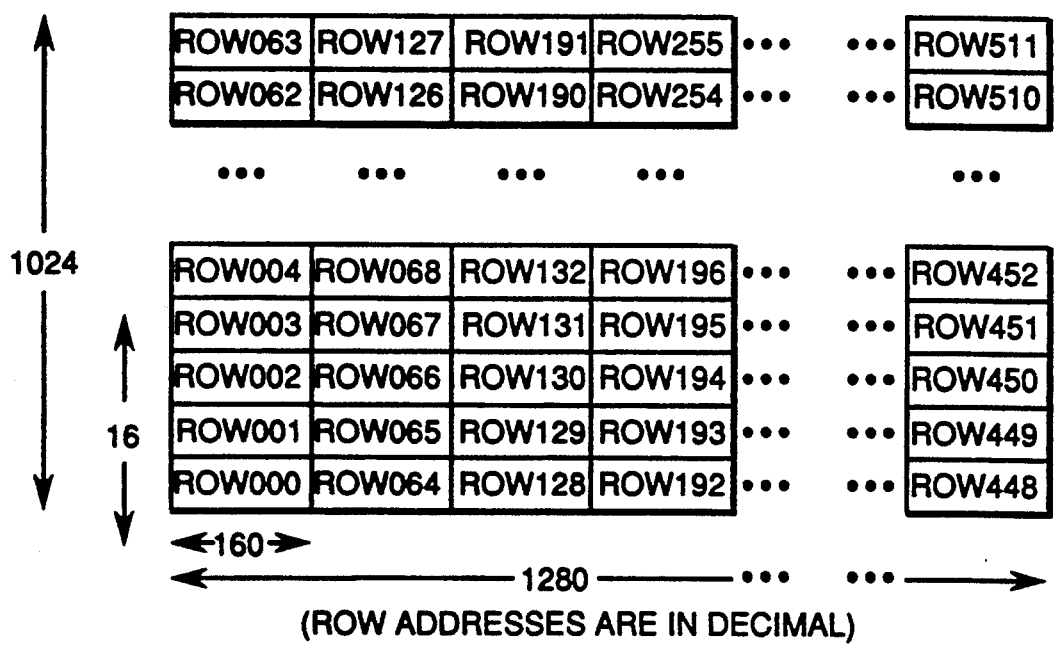
FIG. 4 depicts partitioning of a 1024×1280 graphics display screen into rectangular blocks, or tiles.
Figure 5:
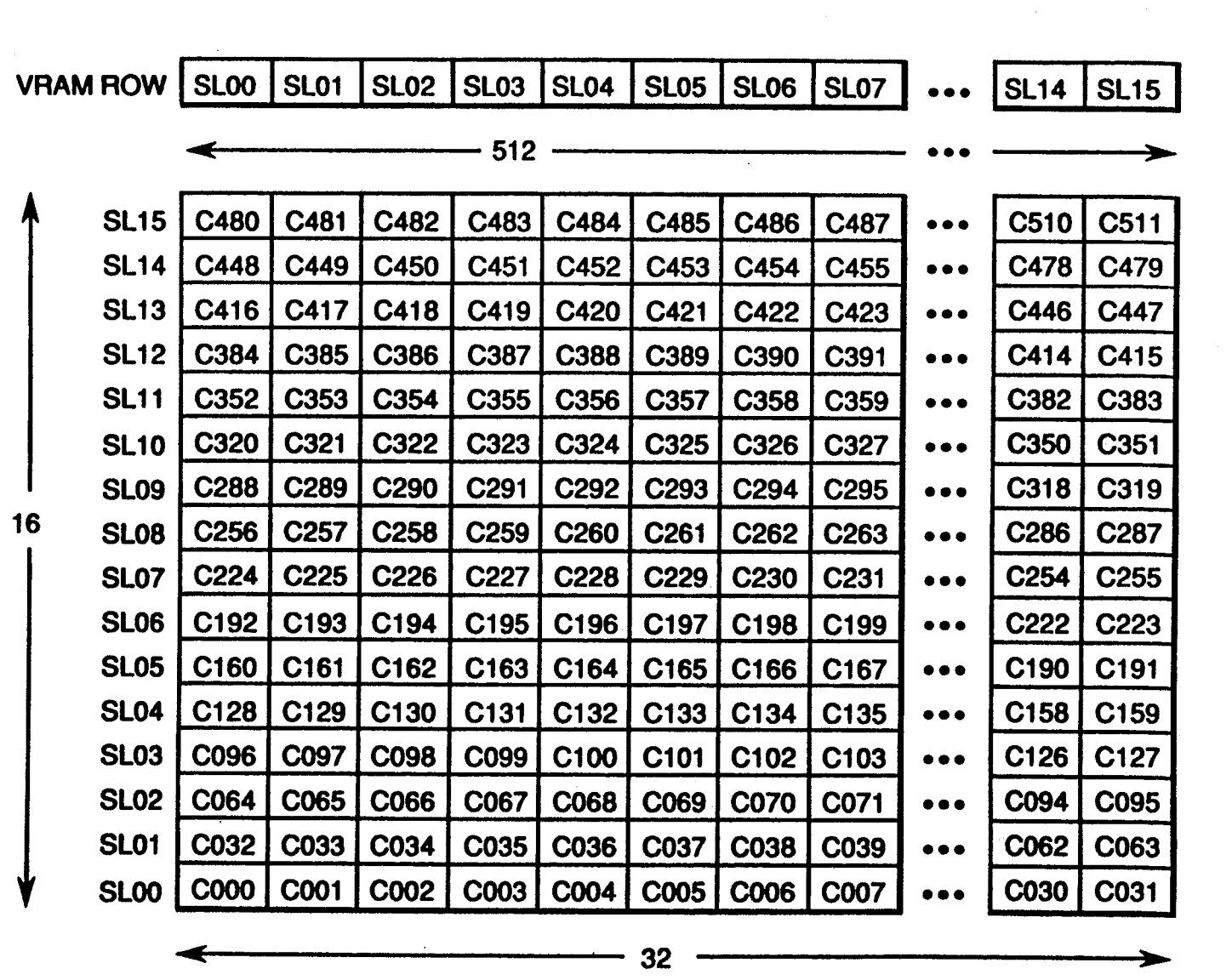

FIG. 4 depicts a typical tiled frame buffer architecture wherein a 1024×1280 screen of pixels is divided into a plurality of 16×160 rectangular blocks of pixels. (The tile size is provided by way of example only. It assumes that raster processing is accomplished by five raster engines coupled in parallel.) Each block has a unique VRAM row address. Within each rectangular block, pixels are mapped into column addresses. FIG. 5 depicts one example of a column address layout. Pursuant to the invention, Decision and Intensity Variables are mapped into the VRAMs in this manner with adjacent pixels within the same tile of a VRAM module, thereby taking advantage of fast "page mode" processing (see U.S. Pat. No. 4,546,451).

Figure 6:
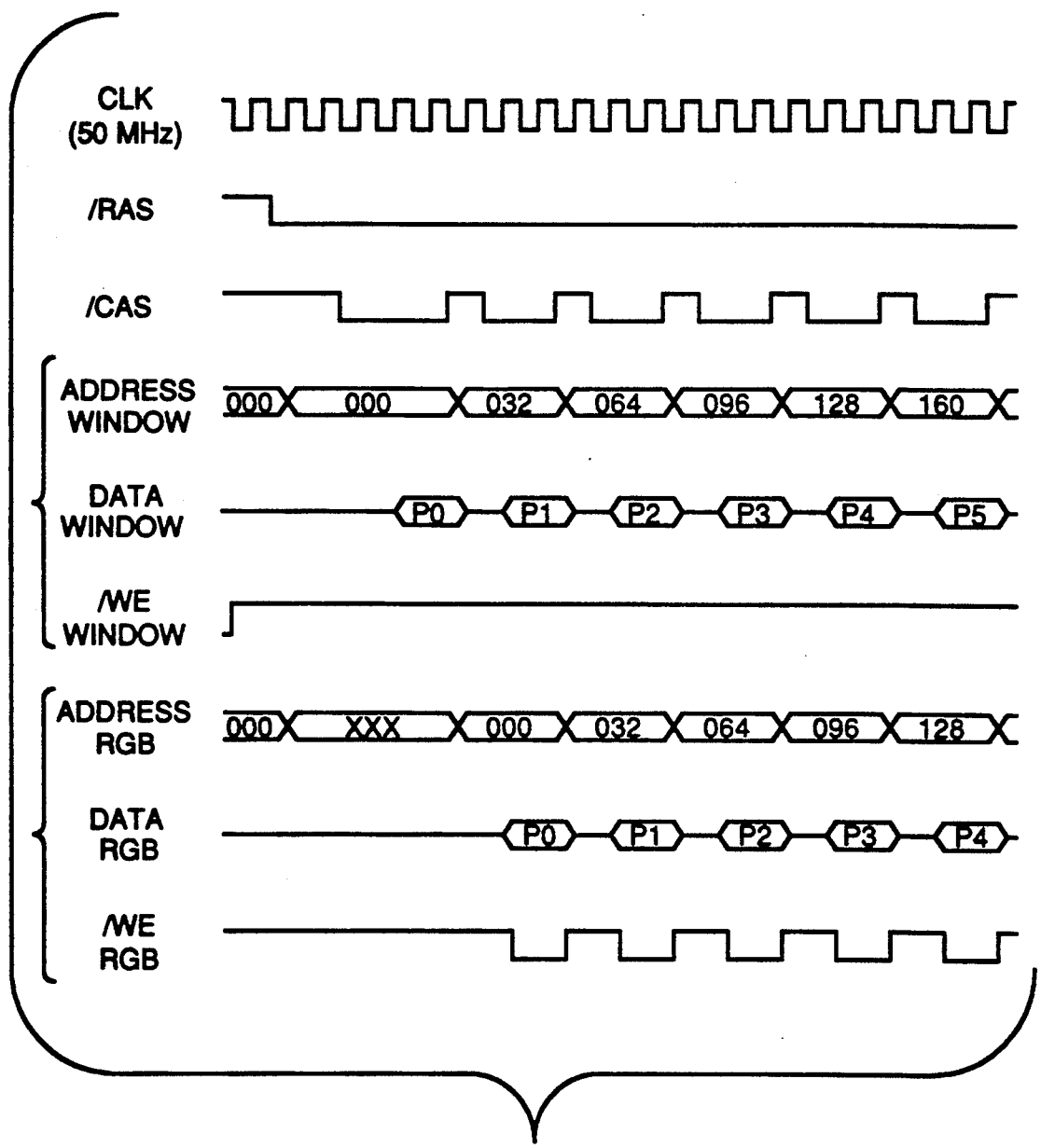
FIG. 6 is a sample timing diagram for prefetching of decision variable values and writing of intensity variable values for updating the pixel variables of the vertical span shown in FIG. 3.

As noted initially, a significant goal of the invention is to reduce the read-modify-write (RMW) processing cycle time. By prefetching Decision Variables, the read (and modify) portion of the RMW cycle can overlap the write portion. Consider the timing diagram of FIG. 6, which shows a typical updating for the vertical span of FIG. 3, starting with pixel (P0) (i.e., assuming the left edge of the pixel tile of FIG. 5 overlies the vertical span (P0) to (P6) of FIG. 3). The Decision Variable (window id) is prefetched a cycle before the intensity variables (R,G,B) are to be written. Thus, after a one cycle latency period, a "read" for the Decision Variable and a "write" for the Intensity Variables occur simultaneously, thereby effecting a read-modify-write every memory cycle (e.g., every 60 nanoseconds).

Figure 7:
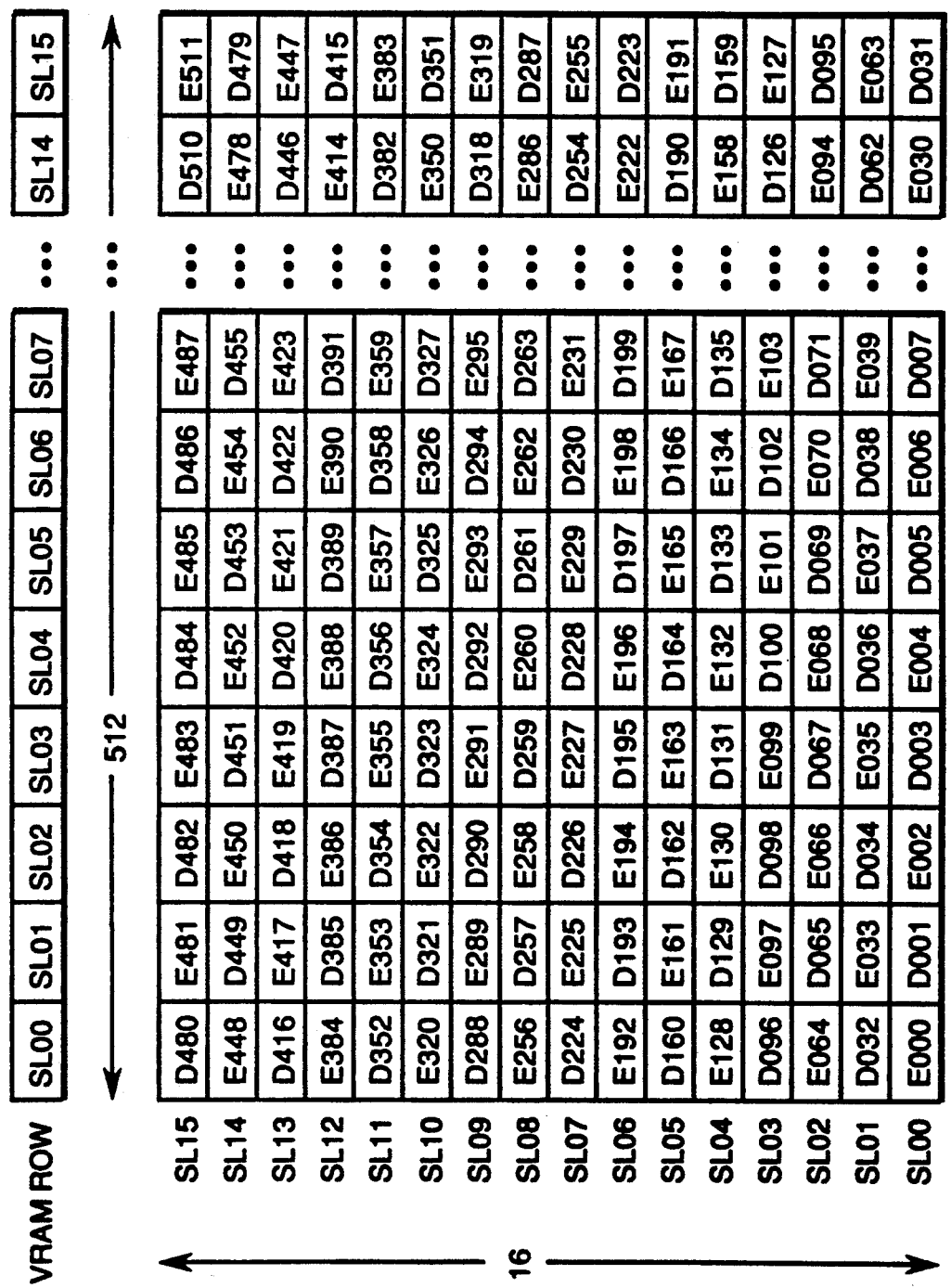
FIG. 7 depicts the mapping of selected variables of adjacent pixels in vertical (or horizontal) spans into one of two separate, but interleaved memory banks pursuant to the present invention.

Decision/Intensity Variables are specially handled pursuant to the present invention. Prefetching of these variables is made possible by mapping adjacent pixels of vertical (or horizontal spans) into separate ones of first and second memory portions (or banks) of a memory module. FIG. 7 is an example of even/odd mapping for a tile in one such bank. The "E's" in FIG. 7 represent even pixels and the "D's" imply odd pixels. By mapping adjacent pixels into different RAM modules and providing dedicated data and address buses to the even and odd banks (see FIG. 9) to allow prefetching, a read-modify-write cycle can be effectively performed in one memory cycle, (e.g., 60 nanoseconds). (Those skilled in the art will recognize that this assumes that the read-modify operation is performed within a single memory cycle.) A significant aspect of this invention resides with the realization that multiple address/data buses are only required for Decision/ Intensity Variables, where they are needed to improve bandwidth. Thus, Decision Variables and Intensity Variables retain a conventional single address/data bus between the frame buffer logic and the corresponding VRAMs of the frame buffer, which thereby minimizes the I/O requirements of the raster engine(s) logic.

Figure 8:
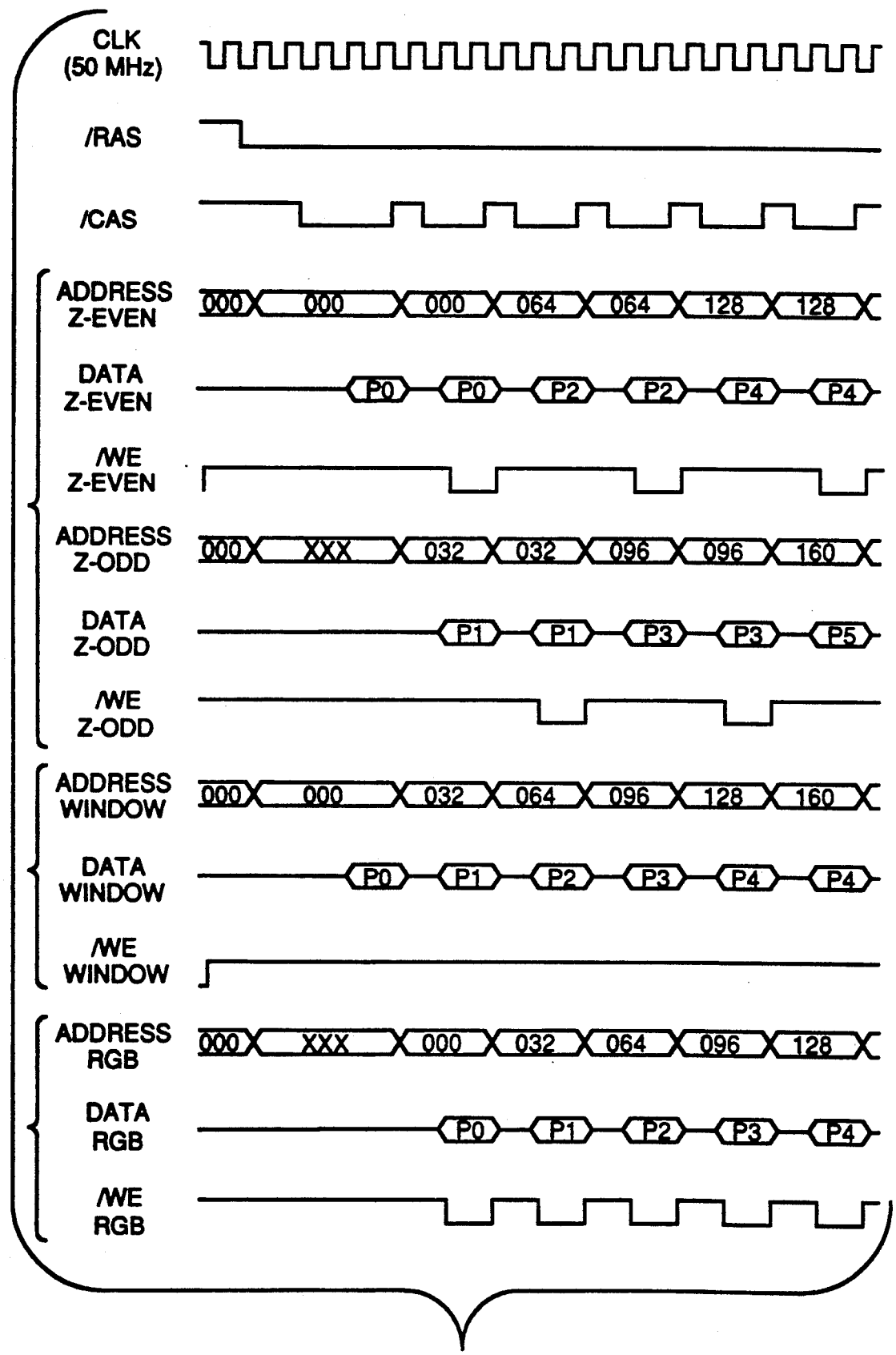
FIG. 8 is a sample timing diagram for Z-buffer rendering of the vertical span shown in FIG. 3.

FIG. 8 shows a timing diagram depicting the rendering, with dual Z-buffers (i.e., a Decision/ Intensity Variable) of the vertical span shown in FIG. 3. Note especially that two independent address/data buses are required to access the interleaved even and odd banks of the Z-buffer memory module within the frame buffer. Prefetching is achieved by overlapping the write portion of the even banks with the read portion of the odd banks (or vice versa). Like the prefetching scheme shown in FIG. 6, a 60 nanosecond read-modify-write cycle is effectively achieved after some latency. (The 60 nanosecond read-modify-write cycle is used herein to only illustrate the invention as being indicative of today's memory technology and should not be considered a limitation on the present invention as described herein and recited in the appended claims.)

A high level data flow diagram, showing four independent address/data buses, is depicted in FIG. 9. As shown, frame buffer logic 12 within raster processor 11' receives pipelined primitive data and interconnects with a modified frame buffer 18'. A first VRAM module 50, which contains Intensity Variable values including color (RGB), interconnects with logic 12 via a single combined address/data bus 51 ("RGB BUS") and provides serial output of intensity variable values. Similarly, logic 12 connects with a VRAM module 52 of buffer 18' via a single address/data bus 53 ("WINDOW/MASK BUS"). Module 52 contains read only, Decision Variable types such as "window id" and "mask". The module provides serial output of window id to an associated RAMDAC (not shown). Dual DRAM structures 54 and 56 within buffer 18' are provided as separate Z-even and Z-odd banks of buffers for the Z-value Decision/Intensity Variable (which again must undergo read-modify-write operations under control of frame buffer logic 12). DRAMs 54 and 56 interconnect with logic 12 via separate groupings of buses 55 and 57 (Z-EVEN BUS, Z-ODD BUS) respectively. As one practical example, I/O pins for buses 51, 55 and 57 may be 32 bits wide while bus 53 may only require 16 bits.

To summarize, read-modify-write memory cycles typically require twice as long to process as a single read or a single write function. The present invention effectively doubles the read-modify-write performance of conventional frame buffer designs by:
- identifying Decision Variables and Intensity Variables;
- identifying Decision/Intensity Variables;
- prefetching Decision Variables;
- interleaving Decision/Intensity Variables of adjacent pixels into opposite memory banks (e.g. even and odd banks); and
- overlapping the writing of one RAM bank with the prefetching of another RAM bank.

Those skilled in the art will recognize that multiple banks are only required for those variables defined as decision/intensity types. Thus, enhanced performance is attained while the number of pins required to access the pixel information in the frame buffer as a whole are minimized in comparison with prior art implementations.

The demand for high fidelity renderings and realism in computer graphics continues to increase. Many of the high fidelity rendering algorithms rely on fast polygon rendering, with hidden surface removal, as the basic building block of complex images. Therefore, the need to perform hidden surface removal has made fast read-modify-write cycles the goal rather than the exception in high performance frame buffer designs. Along with this goal, the technique described herein recognizes the practical restrictions of existing packaging technology by limiting the number of pins (i.e., bits) required to access desired information from the frame buffer.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

I claim:

1. A graphic display system frame buffer for receiving pixel variable values definitive of an object to be rendered on a display screen of the graphics display system, said display screen including an array of pixels each of which is defined by a plurality of pixel variables, said frame buffer comprising:

at least one first module of memory having a storage location corresponding to each pixel of said display screen pixel array, each first memory module being sized to buffer values for at least one particular pixel variable, said at least one particular pixel variable buffered in each first memory module comprising either a decision variable or an intensity variable, said first memory module storage locations being accessible through a single address-/data bus combination; and at least one second module of memory divided into a first bank of memory and a second bank of memory, said first bank and said second bank having interleaved addressing and together having a storage location corresponding to each pixel of said display screen pixel array, each second memory module buffering values of at least one pixel decision/intensity variable, said storage locations of each second memory module being accessible through separate data/address bus combinations to said first and second banks.

2. The frame buffer of claim 1, wherein each first memory module includes a plurality of video RAMs and each second memory module includes a plurality of DRAMs segregated into said first memory bank and said second memory bank.

3. The frame buffer of claim 1, wherein one second memory module comprises a dual Z-buffer for hidden surface removal processing.

4. The frame buffer of claim 1, wherein each first memory module and each second memory module includes means for page mode addressing thereof, said page mode addressing means including means for subdividing said memory into predefined tiles of memory.

5. The frame buffer of claim 4, wherein said first bank and said second bank of each second memory module have even/odd interleaved memory location addressing within each of said memory tiles.

6. A raster processor for processing primitive information definitive of objects to be rendered on a display screen of a graphics system, said display screen having an array of pixels each of which is defined by a plurality of pixel variables, said raster processor comprising:

a frame buffer controller for receiving and processing said primitive information into pixel variable values for rendering an object on said display screen;

a frame buffer divided into at least one first memory module and at least one second memory module, each first memory module having a storage location corresponding to each pixel in said display screen pixel array, each second memory module being divided into a first bank of memory and a second bank of memory, said first bank and said second bank having interleaved addressing and together having a storage location corresponding to each pixel of said display screen pixel array, each first memory module and each second memory module being sized to store a particular pixel variable for the corresponding pixel location of the display screen pixel array;

at least one first address/data bus combination, each first bus being associated with one first memory module of said frame buffer for interconnecting said first memory module and said frame buffer controller;

at least two second address/data bus combinations associated with each second memory module of said frame buffer, one of said second buses interconnecting said first bank of said second memory module and said frame buffer controller, another of said second buses interconnecting said second bank of said second memory module and said frame buffer controller; and wherein each first memory module receives values for at least one pixel decision variable or values for at least one pixel intensity variable for the associated pixel location of the display screen pixel array, and wherein each second memory module receives values for at least one pixel decision/intensity variable for the associated pixel location of the display screen pixel array.

7. The raster processor of claim 6, wherein said first bank and said second bank of each second memory module utilize page mode tile addressing and have alternating even/odd interleaved memory addresses within corresponding page mode tiles.

8. The raster processor of claim 6, wherein said first memory module includes at least one video RAM.

9. The raster processor of claim 6, wherein each second memory module includes at least two DRAMs, and wherein one second memory module comprises a Z-buffer memory, said first bank and said second bank of said Z-buffer memory module having even/odd interleaved memory addressing.

10. The raster processor of claim 6, wherein said frame buffer controller comprises multiple parallel coupled processors, and wherein each first bus and each second bus connects to each of said multiple parallel processors.

11. The raster processor of claim 6, wherein one first memory module contains pixel values of color intensity (RGB).

12. The raster processor of claim 6, wherein one first memory module contains preselected values of window id and mask pixel decision variables.

13. A method for storing pixel variable values definitive of objects to be rendered on a display screen of a graphics system, said display screen including an array of pixels, each pixel being defined by a plurality of pixel variables, said method comprising the steps of:

(a) categorizing pixel variable values for buffering, said categories being based on variable type and comprising decision variables, intensity variables and decision/intensity variables having characteristics of both decision variables and intensity variables;

(b) buffering each decision variable value and each intensity variable value into at least one first type of memory module, said first type of memory module comprising a commonly accessed grouping of memories having a storage location corresponding to each pixel of the display screen pixel array, each first type memory module being accessible by a single address/data bus combination; and (c) buffering said decision/intensity variable values in at least one second type of memory module having separate memory banks, said separate memory banks including a first bank of memory and a second bank of memory, said first bank and said second bank of memories having interleaved addressing and together having a storage location corresponding to each pixel of the display screen pixel array, each second type memory module requiring separate address/data bus combinations for buffering variable values in said first bank and said second bank.

14. The method of claim 13, wherein said first type of memory module receiving said variable values buffered in said step (b) includes at least one video RAM, and wherein said second type of memory module receiving said variable values buffered in said step (c) includes a plurality of DRAMs separated into said first memory bank and said second memory bank.

15. The method of claim 13, wherein said buffering step (c) includes interleaving buffering of said decision/intensity variable values in said first bank and said second bank of memory within each second type of memory module.

16. The method of claim 13, wherein said decision variable category of said step (a) includes values for pixel window id and pixel mask information.

17. The method of claim 13, wherein said intensity variable category of said step (a) includes values of pixel color intensity (RGB).

18. The method of claim 13, wherein said decision/intensity variable category of said step (a) includes Z-values for the object to be rendered on said display screen.

* * * * *